May 31, 1932.  J. D. BALDWIN, JR  1,860,604
METHOD OF MAKING PIPE COUPLINGS OR FITTINGS
Filed Jan. 4, 1929
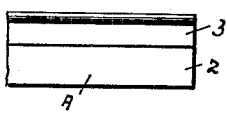
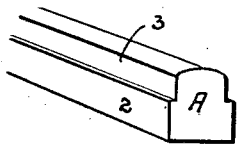
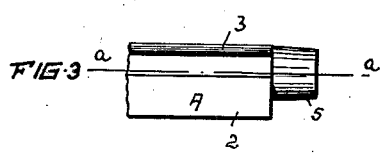
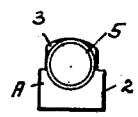
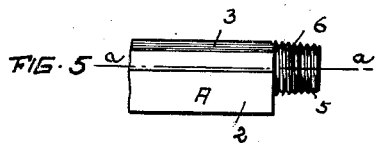
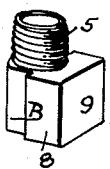
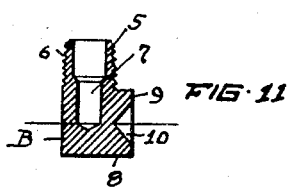
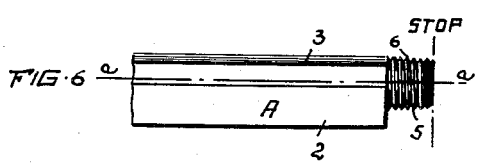
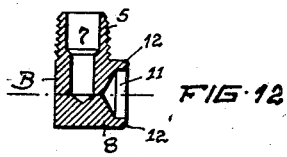
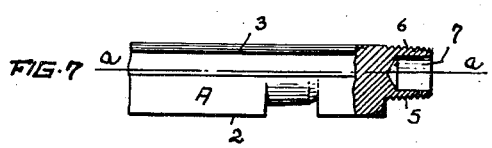
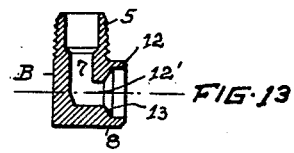
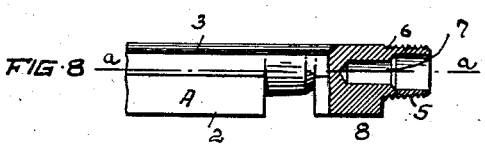
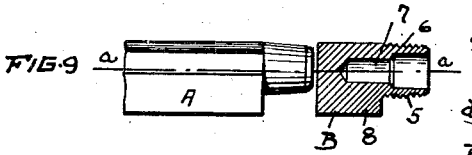
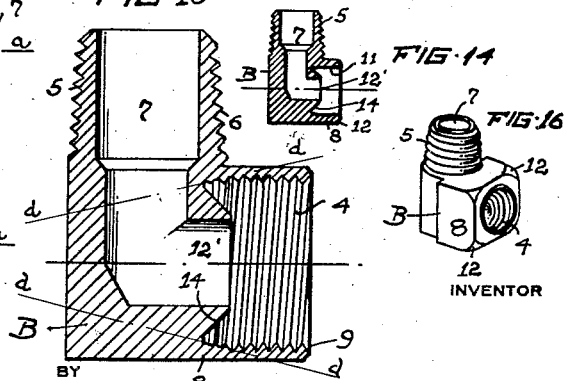
INVENTOR
JOHN D. BALDWIN JR.
BY Fisher, Moser & Moore
ATTORNEY Patented May 31, 1932

1,860,604

UNITED STATES PATENT OFFICE

JOHN D. BALDWIN, JR., OF CLEVELAND, OHIO, ASSIGNOR TO ALBERT J. WEATHERHEAD, JR., OF CLEVELAND, OHIO

METHOD OF MAKING PIPE COUPLINGS OR FITTINGS

Application filed January 4, 1929. Serial No. 330,193.

The present invention relates to a new and novel method of producing pipe couplings, tube fittings and the like, especially angular coupling members and fittings for use with threaded pipes or flanged tubes made of soft metal. In general, my object is to produce angular coupling members, such as elbows, T's, etc., in a cheap and facile way by machine operations, using solid bar or rod stock extruded or rolled to a predetermined shape as hereinafter described, and as exemplified in the accompanying drawings, in which Fig. 1 is a perspective view of a short portion of a rod or bar of irregular shape from which an elbow fitting may be produced, and Figs. 2 to 8 inclusive, are side and end elevations and sectional views of the same bar as it appears at different stages in its treatment until a partially developed member of angular form is severed from the bar. Figs. 9 to 16, inclusive, are side elevations and sectional views illustrating the successive steps taken in producing a fluid passage, threaded socket and a conical seat, within the partially developed angular member severed from the bar.

In practicing the method I first provide a solid rod or bar A of special shape or configuration, for example, in making an elbow shaped coupling member for a flanged pipe, the rod or bar A is preferably of irregular outline in cross section to promote rapid machining operations internally and externally without waste of stock, especially in an elbow wherein one branch must be of larger diameter or dimensions than the other branch extending at an angle in respect thereto. As shown, bar A includes wide and narrow portions 2 and 3, respectively, the wider part 2 being provided to permit a relatively large screw-threaded cavity 4 to be made therein, and the narrower part 3 being provided to permit a cylindrical branch 5 of small diameter to be formed without needless machining or waste of stock. The wider and larger part 2 of the bar may be flat sided, while the narrower and smaller rib-like portion 3 may be either flat-sided or rounded in part. Customarily, bar A is extruded brass stock, which is obtainable in suitable lengths to permit a great many fittings or coupling members to be produced successively from a single bar by feeding the bar intermittently to a series of tools carried by a rotatable turret and other tools carried by a rotatable turret and other holders in an automatic screw machine.

In these operations the bar revolves rapidly, and cutting and tapping operations are effected by bringing different tools successively or concurrently into engagement with the revolving bar. To begin with, bar 2 is caused to revolve around an axis which is off center in respect to the true axis of the bar, the center of revolution being in or involving the smaller cross sectional portion 3 of the bar, as indicated by dotted lines a—a— of Figs. 3 to 9. Accordingly, a section of the narrower portion of the bar may be readily cut and shaped to a circular or round form to produce a branch 5 by bringing a suitable cutting and shaping tool into engagement with the revolving stock, cutting beginning off center in that wider part 2 of the bar and continuing to a greater depth until the narrower portion 3 is slightly reduced and turned to a true circle, as seen in Figs. 3 and 4.

Assuming that this step of rounding a section of the irregular shaped bar has taken place, it is then followed by a threading operation, that is, a screw-thread 6 is either cut or rolled in the round cylindrical surface of branch 5 by bringing a threading tool into engagement with the revolving bar, see Fig. 5. The bar is then fed forward a given distance against a suitable stop, see Fig. 6, thereby bringing another portion of the bar opposite the shaping and threading tools which produced the first threaded cylindrical branch 5. These tools are fed laterally toward the revolving bar, and while these tools are operating on the bar remote from its outer end, drilling of the bar longitudinally is also being accomplished by feeding different sized drills successively to different depths into the outer end of the finished branch 5.

Thus referring to Fig. 7 while the bar is being turned down in part, a large bore 7 is being drilled into the threaded shank 5. Before the turning operation is completed the first drill is withdrawn and a smaller drill inserted to a greater depth to extend bore 7 into the main body, see Fig. 8. In the meantime, the shaping tool has turned the bar to its desired dimensions and shape. Then as the second drill is withdrawn a knife or other cutting tool co-acts with the shaping tool to sever the drilled piece from the reduced round extension or branch which has just been formed (branch 5). This formation has been produced a sufficient distance back from the outer end thereof so that the severed piece will possess a large solid branch 8 projecting at right angles to the smaller drilled branch 5. At this stage of operations this angular product comprises a large branch part 8 which is substantially square in cross section having a flat square end 9, and branch 5 is screw-threaded, hollow and round. When severed, the angular product B is collected with others as rapidly as they are produced, and then introduced singly and successively into a second automatic screw machine with which the following steps are practiced to provide a finished coupling member or fitting capable of being connected to a flanged tube or pipe.

The angular member B (see Fig. 10) is secured within a rotatable chuck with branch 5 extending at right angles to the axis of the chuck, and the flat square end of branch 8 centrally disposed therein and projecting beyond the face of the chuck where a number of different tools may be used successively or contemporaneously on square end 9. First, a center drill is fed forward a predetermined distance axially in respect to square end 9 to produce a flaring cavity 10 therein as illustrated in Fig. 11. Then a tap drill succeeds the center drill to produce a large straight bore 11 of shallow depth within branch 8. During that proceeding a second cutting tool chamfers the corner edges 12 of the square end of branch 8, see Fig. 12. The tap drill and chamfering tool are then withdrawn and a smaller drill entered axially of bore 11 to produce a smaller passage 12'. The drill is projected deep enough to intersect or meet the inner passage 7 in branch 5, see Fig. 13. As a result of the drilling operations described a shoulder 13 is produced at the entrance of passage 12' which shoulder is then re-formed by another tool to extend bore 11 to a greater depth and to produce a cone or conical seating surface 14 at the bottom of bore 11. The smooth wall of this bore extends inwardly on a straight line to the base of the cone, and this wall is then screw-threaded its full length by a threaded tool which is particularly constructed to avoid engagement with cone 14. In this tapping operation the angular member B is rotated in a reverse direction until the tap reaches the bottom of bore 11, whereupon it is revolved in the opposite direction to release the tap. The screw-threads within bore 11 are cut to a uniform size and depth excepting opposite cone 14, where they are made of gradually lessening size or depth, substantially as shown and described in the co-pending application of A. J. Weatherhead, Jr., Serial No. 323,435, filed Dec. 3, 1928. That is to say, the final steps involve the forming of a series of threads spirally to a graduated depth within the wall of bore 11 but only in the circular area surrounding cone 14, as indicated by the converging lines d—d in Fig. 15.

The completed product is a right-angled fitting having a branch 5 adapted to be screwed into another part and a branch 8 adapted to receive a flanged pipe and a clamping nut, which branches differ in shape and size in cross section. Accordingly where such differences exist in an angular fitting or coupling member, the first step in the method is to provide ribbed or grooved rods or bars by rolling or extruding operations and to divide these bars at spaced intervals into smaller parts or sections having roughly the shape or outline of the finished product, the purpose being to conserve metal, to reduce cutting and machining operations to a minimum, and to effect a substantial saving in cost in quantity production. The subsequent steps may be practiced with any suitable machine and tools, but preferably in automatic screw machines, either single or multiple spindle machines.

What I claim, is:

1. A method of producing a pipe coupling or fitting, consisting in machining a bar of irregular configuration in cross section to smaller dimensions at spaced intervals, drilling an opening axially in one end of the bar, severing the machined and drilled portions from the main body of the bar, and subsequently drilling an opening in the severed product at an intersecting angle to the first opening.

2. A method of producing a pipe coupling or fitting from a rod or bar of varying width in cross section, which includes the forming of a reduced cylindrical portion longitudinally in the narrowed part of the bar, and the production from the wider part of the bar of an enlarged extension at right angles to the axis of said bar.

3. A method of producing a passaged body from rod stock which is partly angular and partly reduced in cross section, consisting in making a section of the reduced portion of the rod cylindrical and leaving the angular portion extend at right angles to the axis of the cylindrical portion, in drilling said angularly related portions to provide angularly related communicating passages, and in screw-threading the cylindrical extension and the entrance to one of said passages.

4. A method of producing pipe couplings or fittings, consisting in forming longitudinal ribs or grooves in a rod or bar, subsequently dividing said bar into pieces having roughly the shape of the desired product, and in forming intersecting passages in said pieces, including a perforated conical, bottom and internal screw-threads in one passage.

In testimony whereof I affix my signature.

JOHN D. BALDWIN, Jr.